Sept. 16, 1941.  J. W. BOWMAN  2,256,190
METHOD OF HANDLING CHEWING GUM
Original Filed April 7, 1934  4 Sheets-Sheet 1
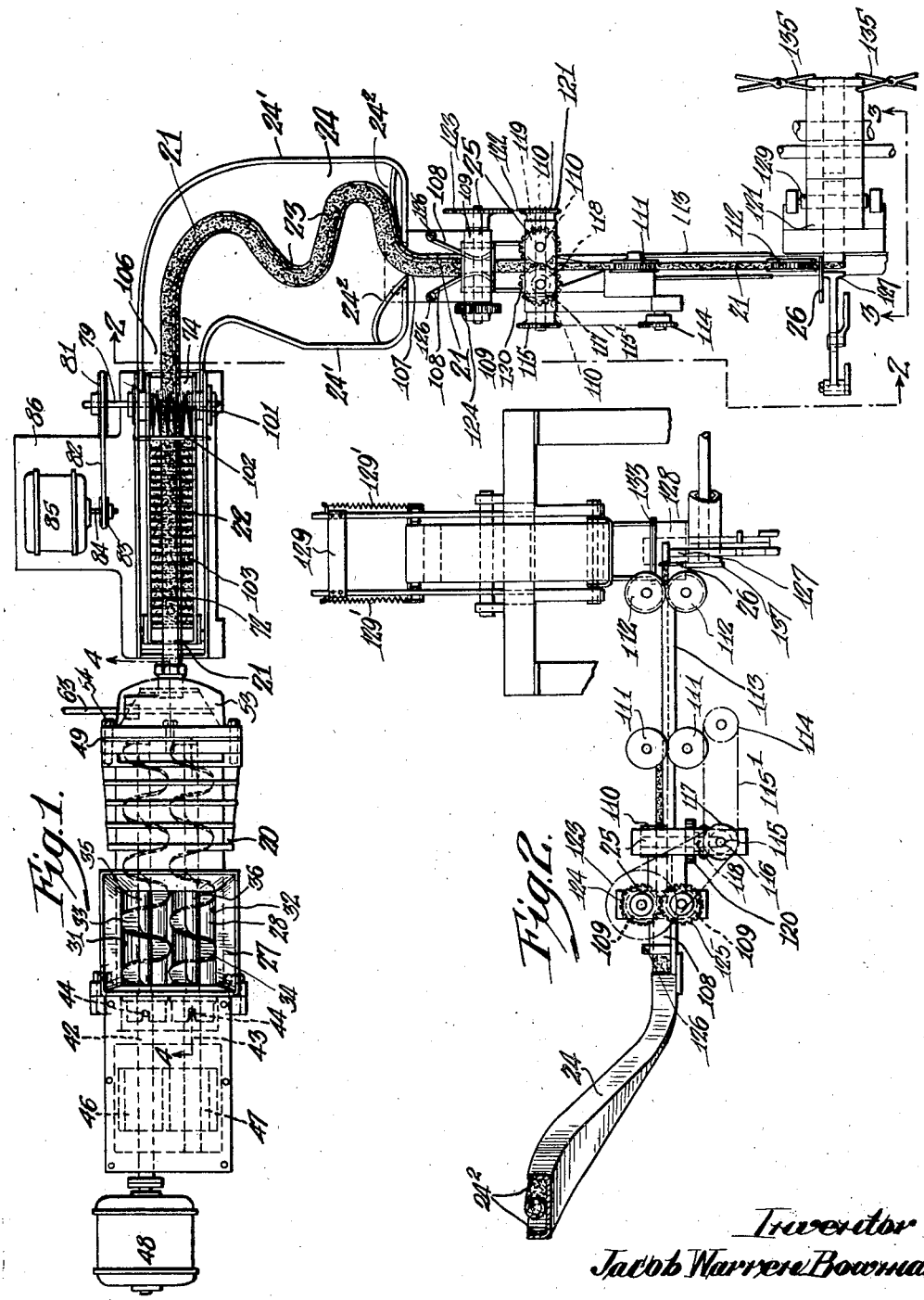

Sept. 16, 1941.  J. W. BOWMAN  2,256,190
METHOD OF HANDLING CHEWING GUM
Original Filed April 7, 1934  4 Sheets-Sheet 2
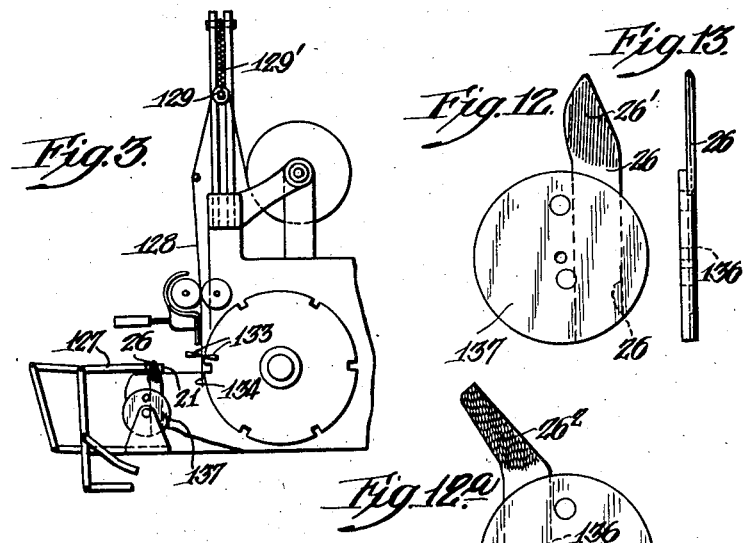
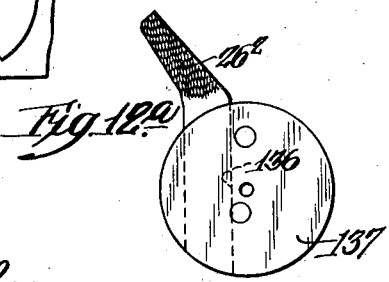
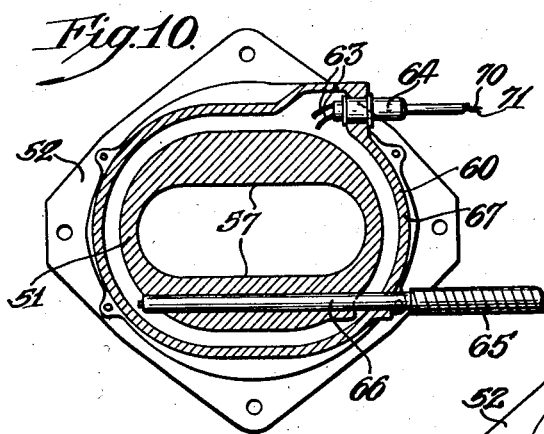
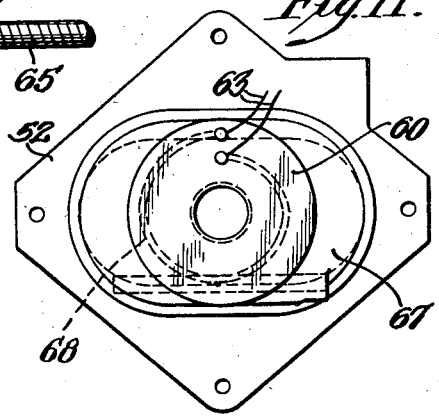
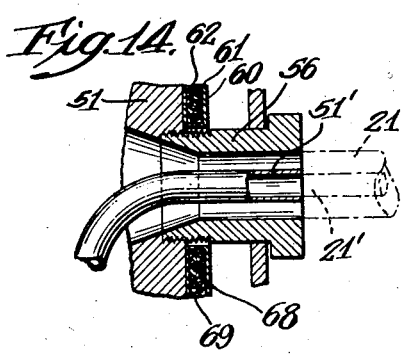

Sept. 16, 1941.  J. W. BOWMAN  2,256,190
METHOD OF HANDLING CHEWING GUM
Original Filed April 7, 1934  4 Sheets-Sheet 3
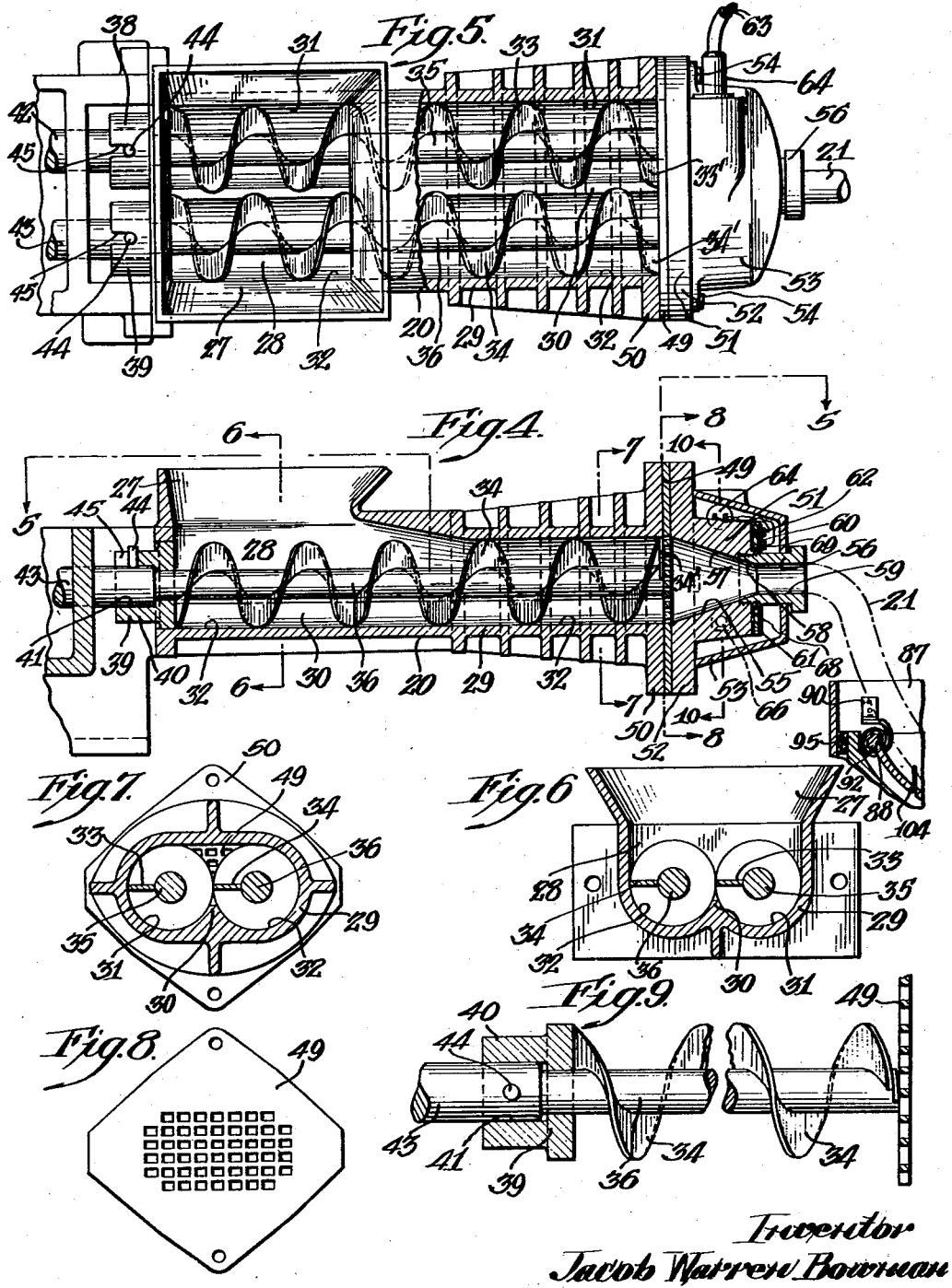

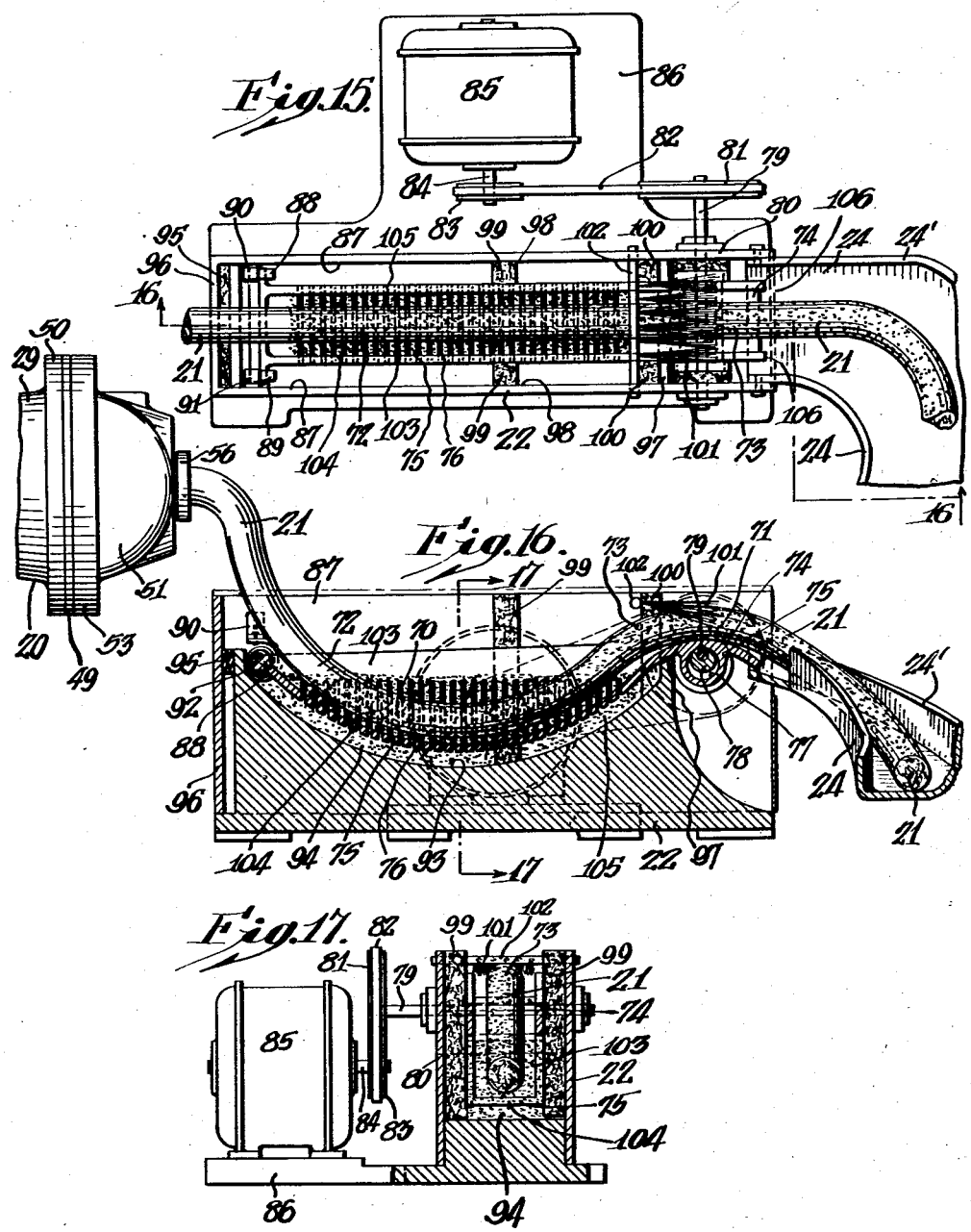

Patented Sept. 16, 1941

2,256,190

UNITED STATES PATENT OFFICE 2,256,190

METHOD OF HANDLING CHEWING GUM

Jacob Warren Bowman, Philadelphia, Pa., assignor, by mesne assignments, to William Steell Jackson and Son, Philadelphia, Pa., a firm comprising William Steell Jackson and Joseph Gray Jackson Original application April 7, 1934, Serial No. 719,450. Divided and this application October 9, 1935, Serial No. 44,148. Renewed February 15, 1940

4 Claims. (Cl. 107—54)

My invention relates to methods for handling and otherwise manipulating chewing gum.

A purpose of my invention is to condition chewing gum, to obtain a desirable consistency of the gum, for example in a hopper from which the gum is extruded as a continuous strand, the strand passing through a container in which the gum is coated with sugar, and mechanism being provided within the container for pulling forward the strand of gum onto a platform on which platform the strand assumes a zig-zag or snake formation, after which the forward end of the strand is re-shaped and longitudinally cut into individual pieces to present the individually cut pieces to mechanism for wrapping.

A further purpose is to provide a method of handling chewing gum by which mass gum dough is extruded into a strand of gum, sugared, moved progressively forward into a snake formation and moved to a wrapping machine for re-shaping, cutting into individual pieces and finally wrapped with a suitable cover of paper or like material.

A further purpose is to provide a method by which a strand of chewing gum is sugared and moved progressively forward from a heated extruding machine to a wrapping machine, with a snake formation in the strand between the extruding machine and the wrapping machine to allow for differences of timing of the different machines and at the same time to allow the strand of gum to be cooled.

A further purpose is to heat chewing gum as it is extruded into a continuous strand for treating with a sugar coating.

A further purpose is to carry a strand of heated chewing gum through a cloud of powdered sugar, the heat in the gum causing the gum to be adhesive and the dust of the cloud engaging the gum.

A further purpose is to handle a strand of heated plastic chewing gum during the interim while it is cooling and to pass the strand and move it progressively forward through a cloud of sugar while the sugar and strand are being agitated to cause the sugar to most effectively adhere to the strand.

A further purpose is to move a strand of heated chewing gum progressively forward through a cloud of sugar, to cut the strand into individual lengths and to sugar the cut sides of the individual lengths.

A further purpose is to pass a serrated knife blade carrying sugar in the serrations through the strand to cause the sugar to adhere to the cut sides of a strand of chewing gum.

A further purpose is to handle chewing gum rapidly from the batch to the wrapped gum, by heating the gum at the nozzle of an extrusion operation while the gum is being reduced from the batch, partially cooling the gum and at the same time coating it with sugar, in cutting the gum while utilizing the sugar on the gum to prevent sticking of the face of the knife against the gum and packaging the gum as it is cut.

A further purpose is to form and package individual lengths of chewing gum which is moved progressively forward by expressing the gum from a mixing chamber through a nozzle while at the same time heating it at the nozzle to make it uniform and plastic, the heat being at a constant temperature, maintaining a sugar dust about and in contact with the strand while it is still at approximately the same temperature, zig-zagging the strand while cooling it to a much lower temperature, feeding the sugared strand while at the same time pressing it laterally and cutting the strand while utilizing the side surface of the knife to carry sugar from the gum surface across the cut surface of the individually cut pieces and of the end of the strand.

A further purpose is to provide a method of cutting and wrapping chewing gum while warm.

Further purposes will appear in the specification and in the claims.

Because of the gummy and sticky nature of chewing gum great difficulty has been encountered in handling chewing gum between a dough mixer and the wrapping operation. In many instances the wrapping is done by hand.

I have discovered that one of the reasons for failure of the art to adopt continuous feeding of gum from the mixing machine to the wrapping machine is that in the past the gum has not been properly cooled before presentation to the cutting or severing knife preparatory to wrapping. Another difficulty in the past is that the gum passing through the extruding die of the mixing machine has not been at the proper temperature.

I believe I am the first to provide a method which involves placing gum dough in a mixing or kneading machine and to cause a strand of gum to be passed continuously from the mixing machine through a nozzle, with an electric heating element about the nozzle to heat the nozzle and thereby cause a free and easy passage of the gum through the nozzle, after which the strand of gum is passed through a sugaring device where the gum is coated with sugar on an agitated platform and at the same time moved longitudinally forward to a platform upon which the strand assumes a snake or serpentine formation.

The strand is then moved forward to re-shaping rollers adjacent a wrapping machine and from the re-shaping rollers to the wrapping machine proper where the strand is cut into individual pieces. The cutting of the individual pieces preparatory to wrapping is accomplished by a rotating knife blade having serrated side surfaces adjacent the cutting edge of the knife. When the blade is rotated each rotation of the knife blade passes the blade through the sugared strand and powdered sugar on the strand engages in the serrations to allow the knife blade to pass through the gum as it is severed.

My invention relates to the method involved in overcoming the difficulties above noted.

I will now describe my invention more in detail, referring to the drawings, which are intended to be merely illustrative of one desirable embodiment of the invention.

Figure 1 is a top plan view of mechanism which may be employed in handling chewing gum according to my improved method.

Figure 2 is a transverse sectional view of a portion of Figure 1 taken on the line 2—2 thereof.

Figure 3 is a fragmentary elevational view of a portion of Figure 1 taken on the line 3—3 thereof.

Figure 4 is a longitudinal sectional view of part of the structure of Figure 1 taken on the line 4—4 thereof.

Figure 5 is a sectional top plan view of Figure 4 taken on the line 5—5 thereof.

Figure 6 is a transverse sectional view of Figure 4 taken on the line 6—6 thereof.

Figure 7 is a transverse sectional view of Figure 4 taken on the line 7—7 thereof.

Figure 8 is a detail view of a separating plate employed on the extruding machine used in carrying out my method, the view being taken on a line corresponding to 8—8 of Figure 4.

Figure 9 is a fragmentary detail view partly in section of part of the structure of Figures 4–8, inclusive.

Figure 10 is a transverse sectional view of Figure 4, taken on the line 10—10 thereof.

Figure 11 is an end view of Figure 4, looking from the right-hand end of the view, with the cover plate removed.

Figure 12 is an elevational view of one form of serrated knife blade used in my invention.

Figure 12a is an elevational view similar to Figure 12, but illustrating a modification.

Figure 13 is an end view of Figure 12.

Figure 14 is a fragmentary sectional view of a portion of the discharge nozzle similar to Figure 4 but illustrating a modification.

Figure 15 is an enlarged top plan view of a sugaring device used in my method.

Figure 16 is a longitudinal sectional view taken on the line 16—16 of Figure 15.

Figure 17 is a transverse sectional view taken on the line 17—17 of Figure 16.

In the drawings like numerals refer to like parts.

In carrying out my invention I place chewing gum dough in a mixing and conditioning machine 20 from which the gum, after proper conditioning, is extruded in a circular strand 21. The strand passes longitudinally towards and is moved progressively forward in a sugar agitator 22 from which the strand discharges in a serpentine or snake formation 23 resting upon a tilted platform 24, desirably assuming a right angle position in plan view, with respect to the mixing and sugaring devices.

The strand then passes progressively through re-shaping rollers 25 from which it is moved while still warm, to a cutting device 26 where the strand is cut into individual pieces which are wrapped, the wrap ends being finally twisted in a wrapping machine similar to that shown in British Patent No. 293,907, dated July 19, 1928.

This application is a division of my application Serial No. 719,450, filed April 7, 1934, for Methods and apparatus for handling chewing gum.

In my improved method I prefer to employ a mixing and extruding machine of the type shown at 20, having a hopper 27 into which a mass of cooked gum dough is placed for proper conditioning.

The interior 28 of the mixing machine 20 is formed by curved casing walls 29 which meet at the central part of the mixer to provide a partition 30. On each side of the partition 30 and in the recesses 31 and 32 of the mixer I place mixing screw members 33 and 34 having longitudinally extending shafts 35 and 36 fastened preferably by welding at 37 to flanged sockets 38 and 39 at the end of the machine adjacent the hopper 27.

Extending outwardly and integral with the flanged sockets 38 and 39 are walls 40 that provide pockets 41 for the ends of operating shafts 42 and 43. Near the end of each of the shafts 42 and 43 I insert a radially extending pin 44 which has its end projecting outwardly some distance from the shaft to fit in recesses 45 in the flanged sockets 38 and 39 constituting in effect a clutch, to cause cooperative movement of the screw members 33 and 34 on their shafts 35 and 36, the flanged sockets 38 and 39 and the shafts 42 and 43 when the shafts 42 and 43 are operated, which in the present showing is accomplished by means of main gears 46 and 47 meshing with each other to cause the screws 33 and 34 to operate in different directions and reduction gearing, not shown, which drives the main gears. The reduction gearing is driven by a motor 48 which operates the screws.

At the end of the mixing machine away from the hopper I place a separating plate 49, securing the plate in place against the flange 50 of the mixing machine casing, with a nozzle 51 having flanges 52 which fit against the separating plate 47, and a cover plate 53, in front of the separating plate 47, the plate and flanges being held together by means of bolts or suitable fastenings 54.

In order to have a scraping and cleaning action on the separating plate by the end blades 33' and 34' of the screws 33 and 34 in the mixing machine, I provide for longitudinal play of the shafts 35 and 36 at the sockets 38 and 39, so that the end blades of the screws move against the separating plate. At the shaft abutting ends I provide a recess 45 into which the pin 44 is inserted longitudinally.

The end of the nozzle head 51 is tapered at its interior center 55 to receive a nozzle die 56 which extends forwardly beyond the cover plate 53. The flanges 52 of the nozzle 51 engage the cover plate 53. The interior 55 of the nozzle 51 is tapered at 57 and matches with the interior rearward end 58 of the nozzle die 56 to provide a smooth tapered surface between the separating plate 49 and the discharge opening 59 of the nozzle die.

In Figure 14 I have shown a variation of the nozzle structure of Figure 4 in which I have illustrated another form of nozzle construction which employs a device for making a hollow strand into which I may insert a filler 21' of another material than chewing gum, through a tube 51'. This modification is particularly adaptable to the heating of the nozzle where it is necessary to have easy extrusion of the gum and to have the gum of proper consistency for passing out of the nozzle.

As an aid to the discharge of the gum from the mixing machine I have found it necessary to heat the nozzle and the nozzle die and my experiments on the construction of a desirable heating device indicated the necessity of thermostatically controlling the heat at the discharging point. The temperature is maintained preferably between 109 and 116 degrees Fahrenheit.

I have therefore illustrated a form of heater which has been found to be adaptable to the present invention. This heater 60 comprises a heating element 61 which surrounds the nozzle die and is fastened to the end 62 of the nozzle 51. The ends 63 of the heating element 61 are secured in a receptacle 64 and at a remote position from the heater is a thermostatic device 65 which is controlled by a tube 66 placed near the opening of the nozzle 51 and inside the casing or cover plate 53. The tube 66 is filled with gas which expands and contracts thereby moving a switch to control the electrical supply to the heater.

The thermostat may be taken as a representation of any conventional thermostat to control the heater and keep the extruding gum at constant temperature.

The heater proper comprises a casing 67, a resistance coil 68 which is placed in the casing and set in a mixture of plastic heat conductive material 69 which after drying assumes a hardened condition. The heating system is supplied with connections 70 and 71, which receive electrical energy at any suitable source. The connection to the source is automatically turned off or on by the thermostat.

After the strand of gum 21 has passed out through the nozzle die 56 of the mixing machine, the strand will curve downwardly some distance to assume a position in the sugaring agitator 22 similar to that shown in Figure 13 in which the agitator 22 is shown in considerable detail.

The strand 21 as extruded from the mixing machine extends downwardly at 72 and upwardly at 73, at which point the strand rests upon the forward curved end 74 of a curved conveyor platform 75, slotted at 76. The forward end of the platform 75 is apertured at 77 for the reception of a cam 78 secured to and actuated by a shaft 79 which extends transversely to the conveyor platform 75 to a position outside the casing 80 of the agitator 22, where a pulley 81 is secured to the shaft 79. The pulley 81 is driven by a belt 82 from a pulley 83 on a shaft 84 connected to a motor 85 mounted upon a platform 86 adjacent the agitator.

At the rear end of the agitator 22 the platform 75 is connected to the side walls 87 of the agitator frame by coiled springs 88 and 89, through brackets 90 and 91. One end of each of the coiled springs is fastened to the platform at 92 and the other end is fastened to each of the brackets.

The interior of the bottom of the agitator is curved at 93 and is shown as of similar shape to the platform with a space 94 between the bottom 93 and the platform. At the rear of the agitator interior, a resilient pad 95 is inserted between the agitator container and an end plate 96, to which container the pad 95 is preferably fastened.

The agitator is provided with a front wall 97 which prevents the escape of sugar from the interior of the agitator.

Towards the front end and inside of the agitator and along the side walls 98 I place resilient pads 99 which extend vertically from the bottom of the agitator to the top thereof. These pads are preferably fastened to the side walls of the agitator. If the platform should tend to move laterally due to the spring suspension of the platform, the pads will act as a buffer to hold the platform in a longitudinal position. The pads are preferably made of felt.

Other resilient pads 100 are positioned adjacent the stop 97 to aid in keeping the platform longitudinally in line.

A brush 101 is fastened in a support 102 and is attached to the agitator side walls with the bristles of the brush extending outwardly to engage the strand of chewing gum as it is passed through the sugaring machine.

The platform is shown in the form of a trough with sides 103 which help to guide the strand as it travels through the sugaring machine.

Sugar is placed in the agitator interior to rest on the bottom 104 of the agitator below and above the platform 75.

The platform is agitated by the action of the cam 78 on the cam shaft 79 through the pulleys and belt, which are motor driven. As the cam turns it will move the platform up and down, at the same time the cam will tend to move the strand forwardly. The movement forward will be aided somewhat by the pushing forward of the strand when the gum is extruded from the mixer.

The movement of the platform either up and down or forwardly agitates the sugar 105 in the container to cause the sugar to form in effect a cloud, which will dust about the strand on the platform and through the slots in the platform, to cause the particles of sugar to adhere to the gum strand which is susceptible to adhesion of such particles as the gum is still warm from its heating for the extrusion operation.

The brush 101 removes the surplus sugar from the strand as the strand is passed from the agitator onto the platform 24. The platform 24 has upwardly turned edges 24' surrounding the entire platform excepting at the entrance 106 and the exit 107, thereby preventing the strand from falling off the platform. Guiding members 24² are provided on the platform to the re-shaping operation.

After the strand has moved from the agitator onto the platform it assumes a snake or serpentine formation thereon and this snake formation allows for differences in timing of the different devices used in my invention and accommodates for the travel of the strand as it is passed from one device to another. The curving of the strand also allows for its cooling sufficiently for re-shaping, cutting and wrapping as hereinafter described. On leaving the platform 24, the strand passes between guides 24² at the exit of the platform.

The strand now passes through laterally adjustable guide members 108, then through a set of horizontal rollers 109, through vertically disposed sets of rollers 110, and on through other sets of horizontal rollers 111 and 112. The horizontal rollers 109, 111 and 112 and the vertical rollers 110 are spaced along a table 113 which supports the strand from one set of rollers to the next, until the strand reaches the knife 26.

The sets of rollers 109, 110, 111 and 112 may be driven in any suitable manner, and at suitably different rates, the forwardmost rollers being driven the fastest because they must pass the gum of smallest cross-section and greatest length per pound. For convenience, I will describe briefly the driving of the sets of rollers 109 and 110, omitting the description of the driving of the sets of rollers 111 and 112, which is largely a duplication. The motor-driven sprocket 114 drives the sprocket 115 by the chain 115'. The driven sprocket 115 is on the shaft 116, which carries a bevel gear 117, engaging a bevel gear 118 on the same shaft as one of the vertical rollers 110. The other vertical roller 110 is driven by the gears 119 and 120 connecting the vertical rollers 110.

On the shaft 116 a second sprocket 121 drives one of the horizontal rollers 109 by a chain 122 connecting to a sprocket 123 on the same shaft as one of the horizontal rollers 109. The horizontal rollers 109 are interconnected by gears 124 and 125. To adjust the size of the strand, the sets of rollers 109, 110, 111 and 112 are changed.

The guide members 108 may be adjusted by loosening the screws 126.

The strand, while it has cooled somewhat in its course of travel from the mixer to the cutter, is still warm when it reaches the knife 26 for the cutting operation.

After the strand is cut by the rotating knife 26, the individual pieces are moved forwardly by a pusher 127 to come in contact with a continuous strip supply of paper 128 from over a roll 129 hung from springs 129' positioned in front of a slot 130 in a recessed drum 131 on a drum shaft 132 which is controlled by a Geneva wheel (not shown).

After the individual piece of gum is brought to a position within the paper 128 in one of the recesses of the drum, a pair of scissors 133 are operated to cut an individual wrap of paper 134 from the paper strip.

The drum is rotated to cause the gum that has been partially covered with an individual wrap to be moved to a position 180° away from the point of insertion within the drum where twisters 135 engage the ends of the wrap to twist the wrap to hold the gum in the wrap and thereby complete a permanent wrapping.

I prefer to extrude a relatively thick strand for passage through the agitator, over the platform, and from the platform to the adjustable guide members 108 because a larger strand is easier to handle and because the larger strand will not be so liable to break or twist unduly. I have therefore preferred to place my reducing rollers beyond the takeup platform rather than have them positioned before the agitator, as the gum is in a condition for easier handling and reducing due to the fact that it has been cooled somewhat and therefore is in a better workable condition than when it has first left the extruder in its heated condition, and due to the fact that the sugared gum is less likely to stick to the reducing rollers.

When the gum has reached the cutter 26 it has been reduced to its proper size for insertion in a wrapper, but the sugar coating supplied by the agitator has not been removed.

I prefer to use a replaceable knife blade having serrations 26' thereon, which I have found to produce the result desired in which, with rotary operation of the knife blade, sugar from the strand of gum engages in the serrations to prevent the gum in its sticky condition from adhering to the knife blade. This cutting operation has always been troublesome to manufacturers and packers of chewing gum and the fact that I have provided the sugar retaining serrations in the knife blade has overcome the previous objection to using a rotary knife.

In the form of knife construction I have preferred to place the knife blade 26 in a recess 135 in a circular member 137. This however is only one of the many forms of mounting of the knife blade that may be employed.

I have also illustrated in Figure 12a a modification of the knife blade of Figure 12, and in which I have shown crossed serrations $26^2$.

The theory of operation is that the side faces of the cutting knife shall carry sugar in them, or retain sugar as a protection against the gum sticking to the side faces. For this purpose recesses are provided in the side face of the knife within which the sugar collects and which not only by the presence of the sugar at intervals break up the continuity of the knife surface which would otherwise contribute to the sticking of the gum to the knife, but if properly made can allow sugar to fall out from the recesses as the knife is cutting, thus interposing sugar between the gum and the unrecessed parts of the side surfaces of the knife.

I find that longitudinal slots which may be notched or grooved, such as are shown in Figure 12 give very satisfactory results and that the knife operates well also when the projecting parts between the recesses are further cut up by other recesses transverse or diagonal to the first recesses, forming a checker surface, as shown in Figure 12a.

In calling these slots "serrations" generally throughout the specification, I am seeking merely a convenient word and do not wish to imply that they must have as sharply defined side edges as accompany serrations in many of the arts.

It will be evident that the platform upon which the strand of gum is carried and by which it is in part fed, during the agitation for the purpose of applying sugar, is in effect a swinging cradle which not only lifts and lowers but concurrently moves forward and backward; and that because of the pressure from the strand being extruded back of it the forward and upward impulses of the cradle are effective to assist in feeding of the strand but the rearward and downward impulses of the platform, or cradle, do not correspondingly retract the strand. The platform or cradle thus has a stroking movement upon the under side of the strand.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of handling chewing gum rapidly from the batch to be wrapped which consists in extruding a strand of bulky section substantially as thick as it is wide, in concurrently with the extrusion surface-heating the extruding strand to surface tackiness, in surface-cooling and surface-sweetening the strand by shaking the strand with sugar along a portion of its travel length and along sequentially later portions of its travel length in reducing, cutting and wrapping the strand.

2. The method of handling chewing gum which consists in continuously extruding a strand of bulky section substantially as thick as it is wide, in concurrently surface heating the extruding strand to surface tackiness, in surface cooling and surface sweetening the strand by powdering the strand along a portion of its travel, cutting the strand transversely only into individual bulky pieces and immediately wrapping said pieces.

3. The method of handling chewing gum rapidly which consists in continuously extruding a strand of bulky section substantially as thick as it is wide, in concurrently with the extrusion surface-heating the extruding strand to surface tackiness, in surface-cooling and surface-sweetening the strand by treating the strand with sugar and in immediately reducing, cutting and wrapping the strand.

4. The method of handling chewing gum rapidly which consists in extruding a strand of bulky section substantially as thick as it is wide having a surface heated to surface tackiness, in surface-cooling and surface-sweetening the strand by coating the strand with sugar along a portion of the travel length and along sequentially later portions of its travel length in reducing, cutting and wrapping the strand.

JACOB WARREN BOWMAN.